(12) United States Patent
Ashida (10) Patent No.: US 9,955,128 B2
(45) Date of Patent: Apr. 24, 2018

(54) IMAGING APPARATUS AND METHOD FOR CONTROLLING THE SAME

(71) Applicant: CANON KABUSHIKI KAISHA, Tokyo (JP)

(72) Inventor: Yuuichirou Ashida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/074,201

(22) Filed: Mar. 18, 2016

(65) Prior Publication Data

US 2016/0286176 A1 Sep. 29, 2016

(30) Foreign Application Priority Data

Mar. 23, 2015 (JP) ................................. 2015-059363

(51) Int. Cl.
*H04N 5/232* (2006.01)
*H04N 9/73* (2006.01)
(Continued)

(52) U.S. Cl.
CPC ......... *H04N 9/045* (2013.01); *G02B 27/0025* (2013.01); *H04N 5/2353* (2013.01);
(Continued)

(58) Field of Classification Search
CPC .................. H04N 9/045; H04N 5/2354; G06T 2207/10024; G06T 2207/10144; G06T 5/50; A61B 1/00096
See application file for complete search history.

(56) References Cited

U.S. PATENT DOCUMENTS 9,113,114 B2 * 8/2015 Lee ...................... H04N 5/2351
2007/0285552 A1 * 12/2007 Kim ...................... H04N 5/3572
348/335

(Continued)

FOREIGN PATENT DOCUMENTS

EP 1592233 A1 11/2005
JP 2012-034130 A 2/2012
(Continued)

OTHER PUBLICATIONS

European Search Report dated Aug. 5, 2016, that issued in the corresponding European Patent Application No. 16159316.5.
(Continued)

*Primary Examiner* — Trung Diep
(74) *Attorney, Agent, or Firm* — Cowan, Liebowitz & Latman, P.C.

(57) ABSTRACT

The present invention provides an imaging apparatus which can reduce the lowering of the precision of the object detection, when detecting the object by using photometric optical elements and a photometric image sensor. The imaging apparatus detects the object by using the photometric optical elements and a photometric, sensor. In this case, weighting coefficients Wr, Wg and Wb are each set at a region in which H in the photometric region is divided into three from the image height 0. The imaging apparatus is structured so as to form information for the object detection by using weighting coefficients which have been set for each of the wavelength regions according to the regions in the photometric region, and accordingly can reduce the lowering of the precision of the object detection.

18 Claims, 8 Drawing Sheets

(51) Int. Cl.
   *H04N 9/04*      (2006.01)
   *G02B 27/00*     (2006.01)
   *H04N 5/243*     (2006.01)
   *H04N 5/235*     (2006.01)

(52) U.S. Cl.
   CPC ..... *H04N 5/23212* (2013.01); *H04N 5/23293* (2013.01); *H04N 5/243* (2013.01)

(56) References Cited

U.S. PATENT DOCUMENTS

| | | | |
|---|---|---|---|
| 2008/0219586 A1* | 9/2008 | Watanabe | H04N 1/6027 |
| | | | 382/274 |
| 2010/0188532 A1* | 7/2010 | Kusaka | H04N 5/23212 |
| | | | 348/240.99 |
| 2011/0262123 A1 | 10/2011 | Ichimiya | |
| 2011/0279710 A1 | 11/2011 | Lee | |

FOREIGN PATENT DOCUMENTS

| | | |
|---|---|---|
| JP | 2012034130 A | 2/2012 |
| JP | 2014206711 A | 10/2014 |

OTHER PUBLICATIONS

European Office Action dated Aug. 16, 2017, that issued in the corresponding European Patent Application No. 16159316.5.
European Search Report dated Aug. 16, 2017, that issued in the corresponding European Patent Application No. 16159316.5.

\* cited by examiner

|     | 0     | 1/3H  | 2/3H  | H     |
|-----|-------|-------|-------|-------|
| IPr | 75%   | 82%   | 90%   | 97%   |
| IPg | 100%  | 93%   | 85%   | 78%   |
| IPb | 69%   | 52%   | 36%   | 19%   |
| Wr  | 0.307 | 0.362 | 0.426 | 0.500 |
| Wg  | 0.410 | 0.408 | 0.406 | 0.402 |
| Wb  | 0.283 | 0.229 | 0.168 | 0.098 |

FIG. 6B

|     | Table.1 (0 ≤ h < 1/3H) | Table.2 (1/3H ≤ h < 2/3H) | Table.3 (2/3H ≤ h < H) |
|-----|-------|-------|-------|
| Wr  | 0.308 | 0.404 | 0.500 |
| Wg  | 0.410 | 0.407 | 0.403 |
| Wb  | 0.282 | 0.189 | 0.097 |

IMAGING APPARATUS AND METHOD FOR CONTROLLING THE SAME

BACKGROUND OF THE INVENTION

Field of the Invention

The present invention relates to an imaging apparatus which detects an object in a field to be photographed with the use of an optical element and an image sensor; a method for controlling the same; and a program.

Description of the Related Art

In recent years, many imaging apparatuses are commercialized which detect an object such as a person existing in a field to be photographed, and can automatically adjust the focus of a photographing lens on the object.

The imaging apparatuses generally detect the object based on information on an image sensor which is formed of a CMOS, a CCD or the like. On the other hand, in recent years, a single-lens reflex camera is commercialized which adopts an image sensor that is formed of a CMOS, a CCD and the like for a photometric sensor for measuring a luminance of the field to be photographed, and not only measures the luminance but also detects a face of a person and the like. The single-lens reflex camera sends information on the detection result to a widely known phase difference detection type of focus detection unit, and thereby can automatically adjust the focus of the photographing lens on the object.

However, it is difficult to give an imaging performance which sufficiently reduces chromatic aberration and the like, to an optical element for photometry (photometric lens) that forms an image on a photometric sensor, by structuring the optical element from a plurality of lenses like the photographing lens, from the viewpoint of a camera size and a cost.

In addition, a material of the photometric lens is generally plastic, and the performance of forming an image on the surface of the photometric sensor occasionally results in being lowered due to a change of a temperature and the like.

Furthermore, it is difficult to provide a lens of which the aberration is sufficiently reduced, not only for the photometric lens but also for a photographing lens which is mounted on a mobile phone and a tablet, from the viewpoint of reduction in the size and the cost.

Because of this, when the object is detected with the use of a lens of which the imaging performance is not high, it becomes a problem for the lens how to enhance the performance for detecting the object. Incidentally, here, the case has been described as an example, where the object is detected, but also when a contrast for focusing is detected, a similar problem occurs.

In order to solve this problem, for instance, Japanese Patent Application Laid-Open No. 2012-34130 discloses a configuration which converts a change of an imaging state of an optical system due to a change of a temperature, into weights Wr, Wg and Wb that correspond to the respective primary color signals of R, G and previously stores the converted weights in an image processing unit, appropriately sets the weights Wr, Wg and Wb in response to the output of a temperature measuring element, and corrects the aberration, for the purpose of reducing the deterioration of an image quality due to the change of the temperature of the optical system.

SUMMARY OF THE INVENTION

However, the conventional technology which is disclosed in Japanese Patent Application Laid-Open No. 2012-34130 is targeted at only the change of the imaging state of the optical system due to the change of the temperature.

Actually, a curvature of an image plane occurs in a plane on the image sensor, and accordingly the weights corresponding to each of the primary color signals of R, G and B can be changed according to a distance (image height) from an optical axis in the image plane, even in a state in which the change of the temperature does not occur.

The present invention is designed with respect to the points as described above, and an object of the present invention is to reduce an influence which the change of an imaging state of a lens gives on an image.

According to an aspect of the present invention, an imaging apparatus comprises: a first image sensor which has sensitivities corresponding to at least a plurality of wavelength regions; and an adding unit which adds signals corresponding to the plurality of wavelength regions, at predetermined ratios, respectively, wherein the adding unit sets the predetermined ratios at different values according to regions in the first image sensor.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
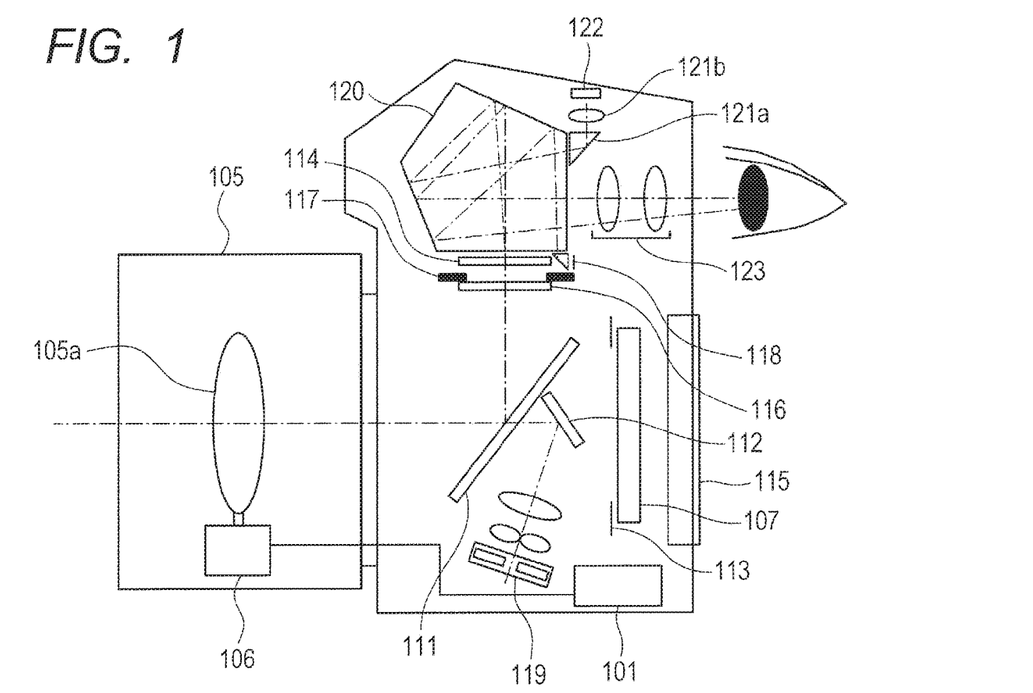
FIG. 1 is a view illustrating a schematic configuration of the inside of a single-lens reflex camera according to embodiments.

FIG. 1 is a view illustrating a schematic configuration of the inside of a single-lens reflex camera (hereafter referred to as camera) according to embodiments. A CPU (central processing unit) 101 is shown, which controls the operation of this camera.

A lens unit 105 contains a photographing lens 105a, and forms an image of light of a field to be photographed, on an imaging sensor 107. Incidentally, in FIG. 1, the photographing lens 105*a* is represented by one lens for convenience, but actually is formed of a plurality of lenses, and can adjust a focus position by moving the lenses. A lens controlling unit 106 is shown, which adjusts a diaphragm in the lens unit 105 and a focus position at the time or photographing, according to instructions sent from the CPU 101.

An imaging sensor 107 contains an image sensor which is formed of a CMOS, a CCD and the like. A main mirror 111 which is a translucent mirror and a sub-mirror 112 are shown. A part of luminous fluxes which have passed through the main mirror 111 are guided to a focus detecting unit 119 through the sub-mirror 112. A focal plane shutter 113 is shown. An external display unit 115 is shown.

A focus detecting plate 116 (hereafter referred to as focusing plate) is shown, which is placed on an imaging plane that is equivalent to the imaging plane of the imaging sensor 107 of the lens unit 105. An image of the field to be photographed is reflected by the main mirror 111, and is primarily formed on the focusing plate 116. A photographer can see this image of the field to be photographed through a pentaprism 120 and an ocular lens 123. In other words, the optical finder has a structure of a so-called TTL type.

A viewing field frame 117 of the finder is shown, which is a component for shielding light of the peripheral part of the luminous fluxes of the object, and thereby making a photographer visually recognize a region to be imaged (imaging region) by the imaging sensor 107. A polymeric dispersing liquid crystal (hereafter referred to as PN liquid crystal) panel 114 is shown, which is a component for making a photographer who peers through the optical finder aware of state display of a focus detecting operation and a focus detecting region, which are shown by the focus detecting unit 119. An in-finder display unit 118 is shown, which is a unit for making the photographer aware of various photographing information on a camera, such as a diaphragm value and a shutter speed, through a light-guiding prism, the pentaprism 120 and the ocular lens 123.

A photometric prism 121*a*, a photometric lens 121*b* and an image sensor for photometry 122 (hereafter referred to as photometric sensor) are shown. The photometric prism 121*a* inflects an optical path of the image of the field to be photographed, which has been formed on the focusing plate 116, and the photometric lens 121*b* forms a secondary image of the field to be photographed on the photometric sensor 122.

The focus detecting unit 119 is shown, which performs a widely known phase difference detecting type of focus detecting operation, and performs a so-called AF (auto focusing) operation that automatically drives the lens unit 105 to the focus position corresponding to the object. The focus detecting operation can be performed generally in a plurality of regions, and in the present embodiment, 19 points of the focus detecting regions 124 are arranged in the middle, above and below, and left and right in the imaging region, as is illustrated in FIG. 2.

Thus, in the case where there are the plurality of focus detecting regions, there are two types of methods according to which the photographer selects the focus detecting region (so-called arbitrarily selecting method and automatically selecting method). The arbitrarily selecting method is such a method that the photographer arbitrarily selects one focus detecting region corresponding to a position to which the photographer desires to adjust the focus in the photographing range. In addition, the automatically selecting method is such a method that the focus detecting region is automatically selected according to a predetermined algorithm, based on the detection result of the focus state in each of the focus detecting regions. An operation which is general as a focus detecting operation in the automatically selecting method includes aligning the focus of the lens unit 105 with an object which is nearest to the photographer side (imaging apparatus side) or an object of which the difference between light and darkness (contrast) is highest, in each of the regions, based on a defocusing amount which has been calculated in each of the focus detecting regions. This automatically selecting operation is referred to as an ordinary automatically-selecting operation. In addition, in the case where there is a person in the field to be photographed, based on the object detection result which will be described later, there is an operation of aligning the focus of the lens unit 105 based on the defocusing amount in the focus detecting region which corresponds to a face position of the person, as one focus detecting operation in the automatically selecting methods. This automatically selecting operation based on the object detection result is referred to as an object detecting priority automatically-selecting operation.

Figure 2:
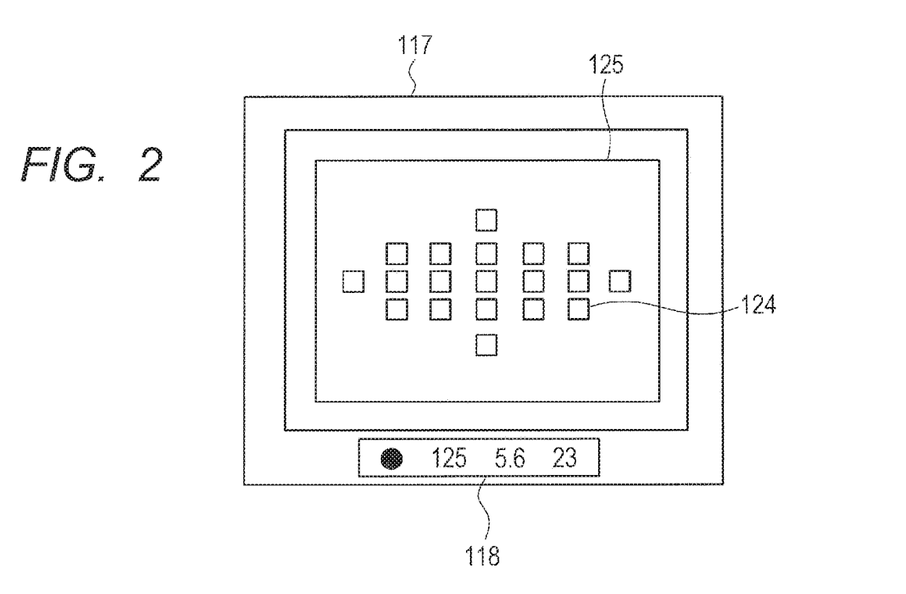
FIG. 2 is a view illustrating a relationship among a viewing field frame of a finder, focus detecting regions and a photometric region.

FIG. 2 is a view illustrating a relationship among a viewing field frame 117 of a finder, 19 points of focus detecting regions 124 and a photometric region 125. In the viewing field frame 117 of the finder, 19 points of the focus detecting regions 124 are displayed by the PN liquid crystal panel 114. For instance, in a state in which one point of the focus detecting region 124 among the 19 points is arbitrarily selected, only a focus detecting region 124 which corresponds to the one point is displayed, and the other 18 points of the focus detecting regions 124 are not displayed; and the photographer results in visually recognizing only the selected focus detecting region 124.

Figure 3:
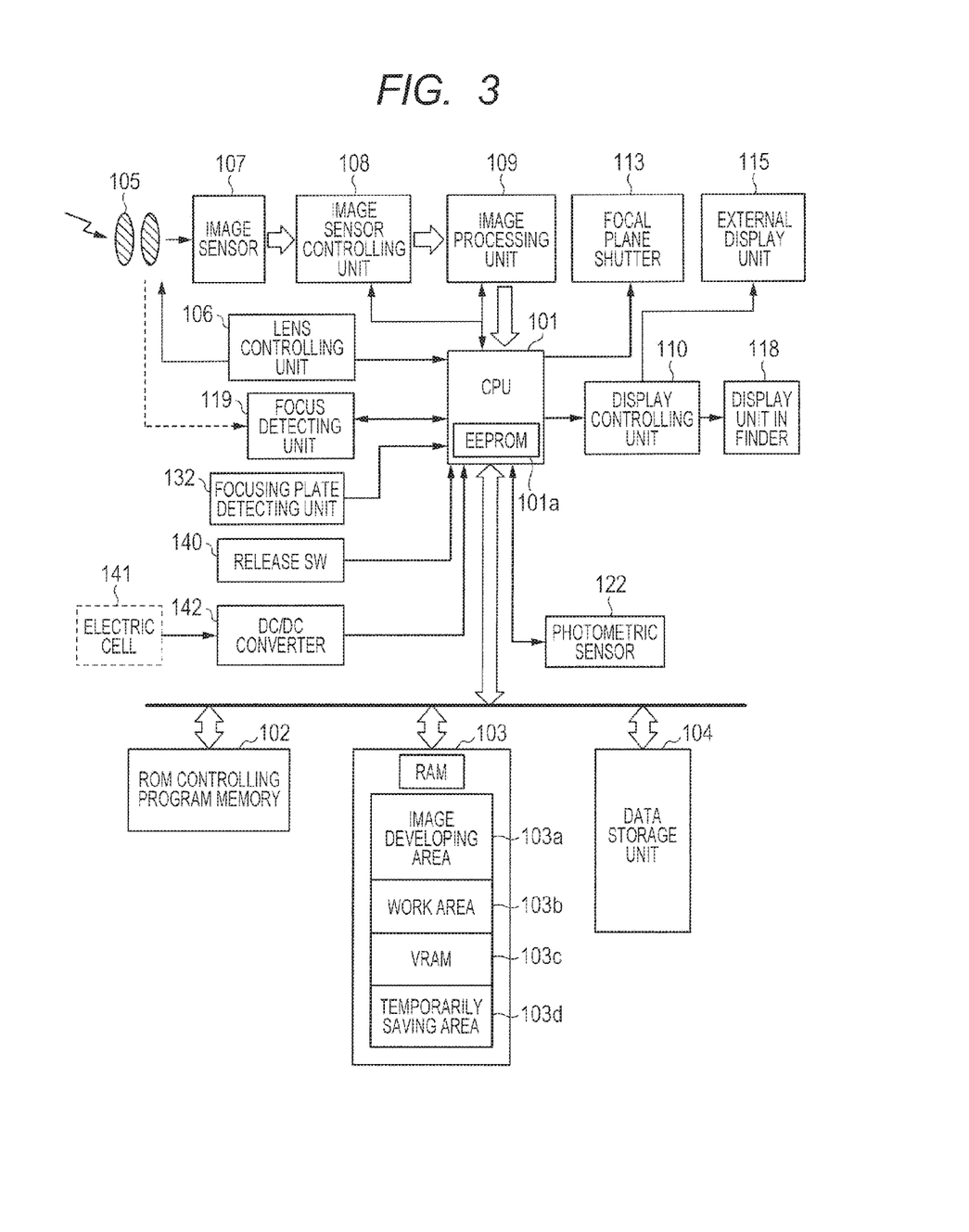
FIG. 3 is a block diagram illustrating the schematic configuration of the single-lens reflex camera according to the embodiment.

FIG. 3 is a block diagram illustrating the schematic configuration of the single-lens reflex camera according to the embodiments. Incidentally, components which have been already described are designated by the same reference numerals, and the descriptions will be omitted.

An EEPROM 101*a* which is a nonvolatile memory is configured in the inside of a CPU 101. A ROM 102, a RAM 103, a data storage area 104, an imaging sensor controlling unit 108, an image processing unit 109, a focal plane shutter 113 and a display controlling unit 110 are connected to the CPU 101. Furthermore, a photometric sensor 122, a lens controlling unit 106, a focus detecting unit 119, a focusing-plate detecting unit 132, a release SW 140 and a DC/DC converter 142 are each connected to the CPU 101.

The CPU 101 performs various controls, based on a control program which is stored in the ROM 102. In these controls, the processes as in the following are contained. The process is, for instance, a process of reading a photographed image signal that has been output from the image processing unit 109, and transfers the image signal to the RAM 103. In addition, the process is a process of transferring data to the display controlling unit 110 from the RAM 103. In addition, the process is a process of compressing image data into JPEG, and storing the compressed image data in the data storage area 104 in a form of a file. The CPU 101 instructs the imaging sensor controlling unit 108, the image processing unit 109, the display controlling unit 110 and the like, so as to change the number of pixels in capturing data and digital image processing.

The focus detecting unit 119 contains a pair of line CCD sensors for focus detection, subjects a voltage obtained from the line sensor to A/D conversion, and sends the converted voltage to the CPU 101. The focus detecting unit 119 controls also an accumulation time period of the line sensor and AGC (auto gain control), under the control of the CPU 101.

In addition, the CPU 101 controls the accumulation time period and a gain of the photometric sensor 122, and forms luminance signals based on each of the primary color signals of R, G and B, and signals for object detection. Analog electric signals of the photometric sensor 122 are subjected to A/D conversion in the CPU 101, and each becomes a digital signal of 8 bits. The CPU 101 subjects the analog signals of each of the colors of R, G and B which are arrayed into 640×480 pixels (approximately 300,000 pixels) that have been obtained from the photometric sensor 122, according to a Bayer method or a stripe method, to A/D conversion, and stores the converted signals in the RAM 103 once as digital signals. The CPU 101 forms the luminance signal and the signal for the object detection, based on the output from the photometric sensor 122, which has been stored as the digital signal, and performs an object detecting operation and an exposure controlling operation which wall be described later.

In addition, the CPU 101 outputs instructions to a photographing operation which follows the operation of the release SW 140, and a control signal for controlling a supply of a power source to each of the elements, to a DC/DC converter 142.

The RAM 103 is provided with an image developing area 103a, a work area 103b, a VRAM 103c and a temporary saving area 103d. The image developing area 103a is used as a temporary buffer for temporarily storing a photographed image (YUV digital signal) sent from the image processing unit 109 and JPEG compressed image data read out from the data storage area 104. In addition, the image developing area 103a is used as an image-specific work area for image compression processing and decompression processing. The work area 103b is a work area for various programs. The VRAM 103c is used as a VRAM in which the display data is stored that is to be displayed on the external display unit 115. The temporary saving area 103d is an area for temporarily saving various data therein.

The data storage area 104 is a flash memory for storing the photographed image data which has been compressed into JPEG by the CPU 101, or various attached data and the like which applications refer to, in a file form.

The imaging sensor 107 subjects a photographed image which has been projected by the lens unit 105 to photoelectric conversion processing, and converts image signals into analog electric signals. The imaging sensor 107 can output pixel data which has been thinned out in horizontal and vertical directions, according to instructions to convert the resolution, which are sent from the CPU 101. In the present embodiment, the imaging sensor 107 has approximately 10 million effective pixels (3888×2592).

The imaging sensor controlling unit 108 includes a timing generator for supplying a transfer clock signal and a shutter signal to the imaging sensor 107, and a circuit for subjecting signals output from the sensor to noise removal and gain processing. The imaging sensor controlling unit 108 further includes an A/D conversion circuit for converting the analog signals to digital signals of 10 bits, and a circuit for performing pixel thinning-out processing according to the instructions to convert the resolution, which are sent from the CPU 101.

The image processing unit 109 subjects the digital signals of 10 bits, which have been output from the imaging sensor controlling unit 108, to image processing such as gamma conversion, color space conversion, white balance, AE and flash correction, and outputs digital signals of 8 bits in YUV (4:2:2) format.

The display controlling unit 110 controls display on the external display unit 115. The display controlling unit 110 receives YUV digital image data which has been transferred from the image processing unit 109, or YUV digital image data which is decompressed data of JPEG in an image file in the data storage area 104. After having converted the YUV digital image data into RGB digital signals, the display controlling unit 110 outputs the RGB digital signals to the external display unit 115. The external display unit 115 is a TFT color liquid crystal which can display an image which has been imaged by the imaging sensor 107 and then has been subjected to the thinning-out processing in each of vertical and horizontal directions. The display controlling unit 110 also drives the PN liquid crystal panel 114, and controls the display on the in-finder display unit 118.

An electric cell 141 is a rechargeable secondary cell or a dry cell. A DC/DC converter 142 receives a power supply from the electric cell 141, produces a plurality of power sources by raising the voltage and performing regulation, and supplies power sources of voltages necessary for each element including the CPU 101. The DC/DC converter 142 is structured so as to be capable of controlling the start and stop of the supply of the voltage to each of the elements, in response to the control signal sent from the CPU 101.

Next, a photometric unit will be described below which measures the luminance of a field to be photographed, by using optical elements for photometry (photometric lens 121b and photometric prism 121a), and a photometric sensor 122. The camera detects an object by using the optical elements for photometry and the photometric sensor 122 as will be described later. Accordingly the imaging performance of the photometric lens 121b is required to have an adequate imaging performance, but is structured of one lens from a view point of a camera size and the cost. The imaging performance of the photometric lens 121b and the like will be described later in detail.

The photometric sensor 122 is a sensor having sensitivity in at least two or more wavelength regions, and is a CCD, for instance, having a high pixel density of horizontally 640 pixels×vertically 480 pixels and a pixel pitch of approximately 6 μm. Color filters of three colors of R, G and B are arranged on the pixel according to Bayer or stripe array. The output of data obtained in the photometric sensor 122 is subjected to YUV conversion processing, and thereby the luminance signal and the color-difference signal of the field to be photographed can be obtained, which are used for the computation of an exposure control value. In addition, the weights for each of the primary color signals of R, G and B in the output of data which has been obtained in the photometric sensor 122 are appropriately changed and synthesized, and thereby the synthesized data is used for the object detection.

The photometric lens 121b is a lens having an imaging magnification of 0.15 times, for instance, and the photometric sensor 122 is structured so as to be capable of observing a slightly inner side than the viewing field frame 117 of the finder (photometric region 125), as is illustrated in FIG. 2. The photometric region 125 is roughly divided into horizontally 20×vertically 20 (one region results in having 32×24 pixels) at the time of photometric measurement, and is used as a sensor having a low pixel density of 400 pixels. The CPU 101 is structured so as to be capable of computing weights for the values of the RGB sensor output of the photometric sensor 122 in the regions of horizontally 20×vertically 20 by using a weighting coefficient which has been uniformly set in the photometric region 125, and thereby calculating the luminance values, and then detect the luminance of the field to be photographed from the sum or the average value of each of the regions.

In order to give an appropriate exposure to a main object, the CPU 101 performs a predetermined weighting computation for the luminance values of the field to be photographed corresponding to divisions of horizontally 20×vertically 20, which have been obtained from the photometric sensor 122, while considering the selected focus detecting region 124 as the center, and calculates an exposure control value. The exposure controlling operation sets the control value for an unillustrated aperture diaphragm in the lens unit 105 and the control value for a shutter speed of the focal plane shutter 113, based on the calculated exposure control value. The light amount which is appropriate for the object reaches the imaging sensor 107 due to the control value, and a picture having a desired brightness can be photographed.

The camera has the release SW 140 provided therein, and is structured so as to be capable of detecting a first stage (half pressing) and a second stage (full pressing), based on a pushed amount. Hereafter, the first stage of the release SW 140 will be described as an SW1, and the second stage as an SW2. As for the operation of the release SW 140, when the photographer pushes the release SW 140 down to the SW1, the focusing detecting operation and the exposure controlling operation are performed, and the AF operation of the lens unit 105 and the exposure control value for the camera are set. Subsequently, when the photographer pushes the release SW 140 down to the SW2, the main mirror 111 retracts to the outside of the luminous fluxes of the lens unit 105, and the diaphragm value of the lens unit 105 and the shutter speed of the focal plane shutter 113 are controlled according to the values set in the exposure controlling operation. The incident luminous fluxes of the object are subjected to the photoelectric conversion processing by the imaging sensor 107. After that, the result is recorded in the recording media as a photographed image, and the photographed image is displayed on the external display unit 115. The operations become basic photographing operations, which include the focus detecting operation, the exposure controlling operation and when the recording of the image by pushing the release SW 140.

Next, an object detecting unit will be described which detects the object in the field to be photographed by using the optical elements for photometry and the photometric sensor 122. The object is detected with the use of the output of the photometric sensor 122, and accordingly the photometric region 125 becomes the object detecting range. At the time of the object detecting operation, the object detecting unit does not roughly divide the photometric region 125 into horizontally 20×vertically 20 as in the time of previously described photometric measurement, but divides the region into horizontally 640×vertically 480 pixels (approximately 300,000 pixels), in order to make the photometric sensor 122 recognize the object finely, and uses the photometric sensor 122 as an image sensor having high pixel density.

In the present embodiment, the case will be described below where a face of a person is mainly detected as a target of the object detection. As for a technique of detecting the face of the person, there are various techniques which include extracting a feature part of a face such as the eyes, a nose and a mouth, and determining whether the object is a face or not, but in the present embodiment, the object detecting unit shall extract the feature part of the face from information for the object detection which has been obtained from the photometric sensor 122, and detect the face. Incidentally, in the present invention, the target and the technique of the object detection are not limited, and the object may be detected with the use of the information for the object detection.

Here, a relationship between the imaging performance of the photometric lens 121b and the photometric sensor 122 will be described below, with reference to FIGS. 4A and 4B. The camera uses the photometric lens 121b to detect an object, and accordingly as the photometric lens 121b has a higher imaging performance, the camera can detect a finer object. However, the photometric lens 121b is formed of one lens from the viewpoint of a camera size and the cost, as has been described above, and accordingly aberration such as axial chromatic aberration and curvature of the image plane occurs.

Figure 4A:
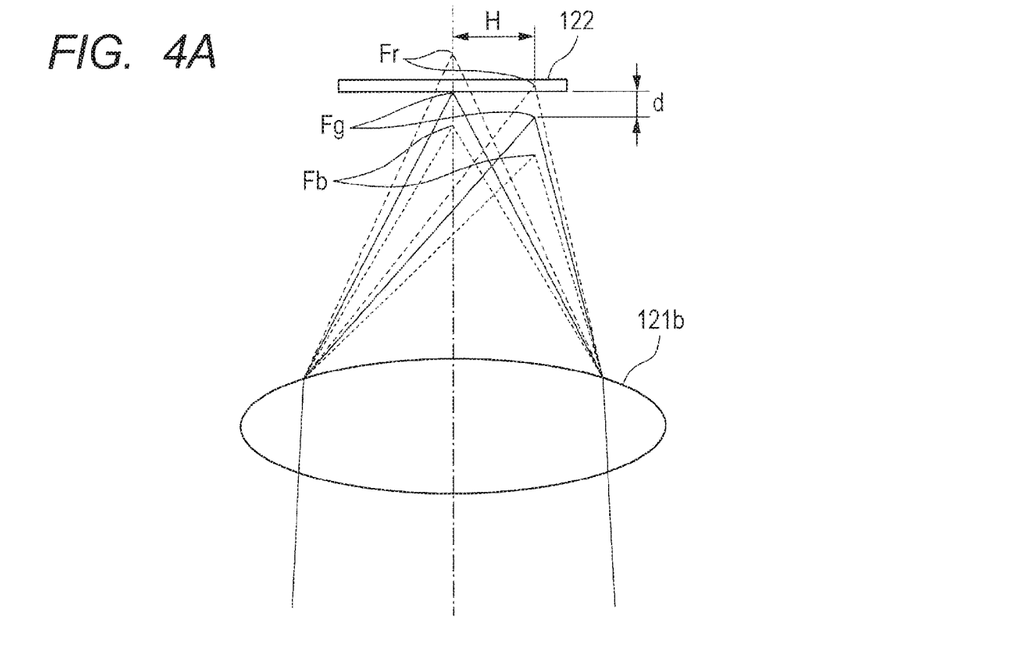
FIGS. 4A and 4B are views for describing optical Characteristics of a photometric lens.

FIG. 4A is a view illustrating an imaging state of the photometric lens 121b. Reference characters Fr, Fg and Fb in FIG. 4A illustrate the imaging positions of rays of light having wavelengths that correspond to main wavelengths of each of the colors of R, G and B, respectively, which the photometric sensor 122 has. The lengths of the wavelengths are B<G<R, and the photometric lens 121b has such characteristics that as the wavelength of a ray of light is shorter, the refractive index is higher. Because of this, the imaging position Fb of B exists on a nearer side to the photometric lens 121b and the imaging position Fr of R exists on a farther side from the photometric lens 121b than the imaging position Fg of G (axial chromatic aberration).

In the peripheral part in which the image height is distant by H from the imaging position Fg of G in the central part, the imaging position Fg of C forms an image at a position which is shifted only by d in an optical axis direction (curvature of image plane). Also in the peripheral part in which the image height is distant only by H, the relationships among the imaging positions Fr, Fg and Fb are similar to the relationship in the central part; and the imaging position Fb of B exists on a nearer side to the photometric lens 121b and the imaging position Fr of R exists on a farther side from the photometric lens 121b than the imaging position Fg of G.

When forming the luminance signals, the CPU 101 generally computes the values while weighting the signals of C, which the photometric sensor 122 has. Then, suppose that a positional relationship between the photometric sensor 122 and the photometric lens 121b is kept by an unillustrated holding member and the like so that the imaging position Fg of C by the photometric lens 121b coincides with the central part of the photometric sensor 122.

Figure 4B:
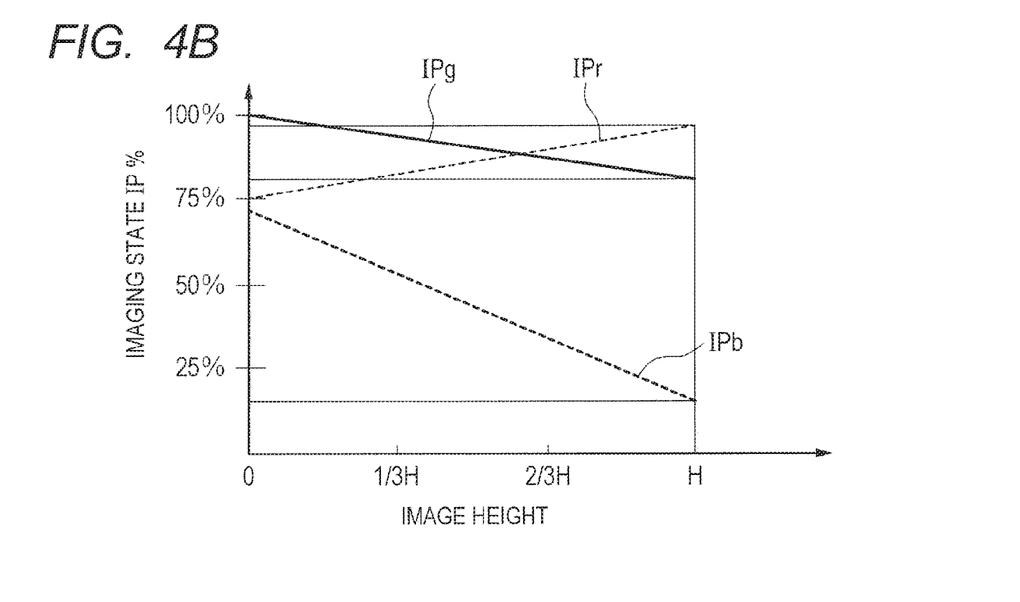

FIGS. 4A and 4B are characteristic diagrams illustrating relationships among the imaging states (Imaging performance) IPg, IPr and IPb and the image height of rays of light having wavelengths that correspond to the main wavelengths of each of the colors of P, G and B, respectively, which the photometric sensor 122 has, in the state in which the central part of the photometric sensor 122 coincides with the imaging position Fg of G by the photometric lens 121b.

The imaging state IP shows a ratio of the imaging performance at the imaging positions of each of the colors. When the image height is 0, for instance, in other words, in the center of the optical axis, the imaging position Fg of G coincides with the central part of the photometric sensor 122, as has been described above, and accordingly IPg becomes 100%. Then, as the image height becomes higher, IPg lowers.

As for IPr, the imaging position. Fr of R does not coincide with the central part of the photometric sensor 122 when the image height is 0, and accordingly the IPr becomes approximately 75%. Then, as the image height becomes higher, IPr rises; and in the image height H, the imaging position Fr of R approximately coincides with the peripheral part of the photometric sensor 122, and accordingly IPr becomes approximately 100%.

As for IPb, when the image height is 0, IPb becomes approximately 75%, similarly to IPr. Then, as the image height becomes higher, IPr lowers, which is different from IPr.

The imaging performance of the photometric lens 121b and the photometric sensor 122 have been described above, but the relationship between the imaging performance of the photometric lens 121b and the precision of the object detecting unit will be described later in detail.

An object of the present invention will be revealed below.

Figure 5A:
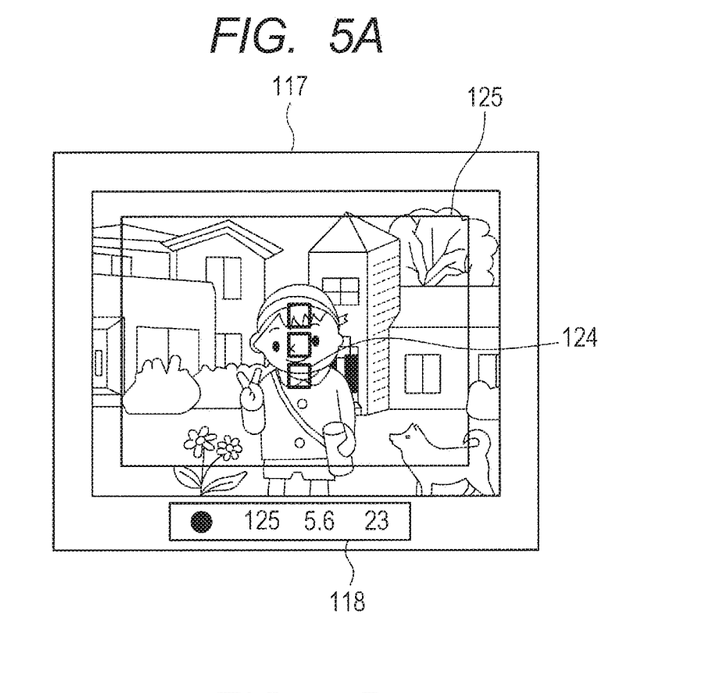
FIGS. 5A and 5B are views illustrating a state in which the focus has been automatically detected after an object has been detected, in the case where there is a person in a field, to be photographed.
Figure 5B:
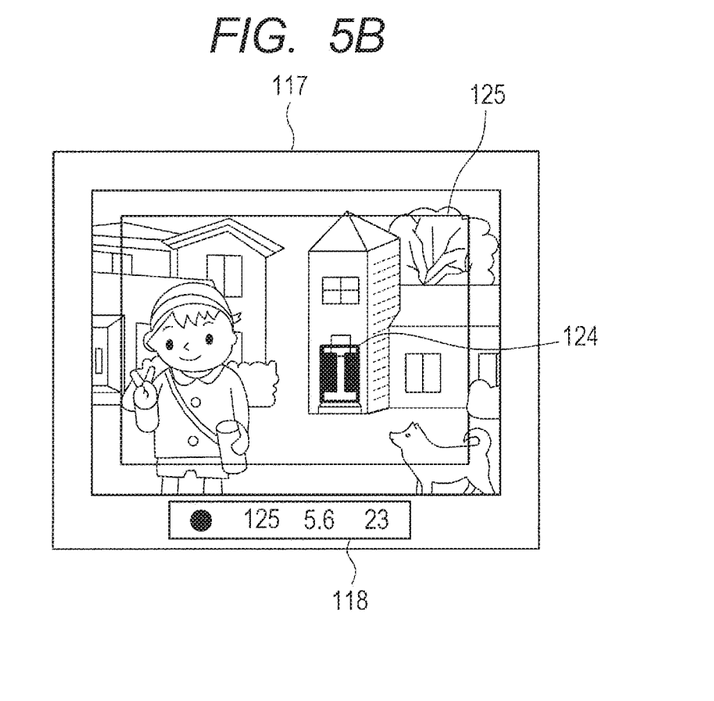

Firstly, problems in the case where the CPU 101 detects the object by using the photometric optical elements and the photometric image sensor will be described below with reference to FIGS. 5A and 5B. FIGS. 5A and 5B illustrate the state in which the focus has been automatically detected after the object has been detected, in the case where there is a person in the field to be photographed; FIG. 5A is the state in the case where there is the person in the central part of the field to be photographed; and FIG. 5B is the state in the case where there is the person in the peripheral part of the field to be photographed.

After the SW1 has been held, the photometric sensor 122 starts accumulating signals based on the instructions sent from the CPU 101, computes the signals of each of the colors of R, G and B at predetermined ratios, and forms signals for object detection; and then the CPU 101 detects the feature part, and thereby determines whether or not there is a person in the field to be photographed.

Here, the resolution of each of the colors and the precision of the object detection are to be described, and accordingly, for convenience, the CPU 101 shall compute only G. The imaging state IPg of G on the photometric sensor 122 is 100% in the central part, and IPg has such a feature that as the image height becomes higher, IPg lowers, as has been described in FIG. 4A. Because of this, an image formed by the signals for object detection, which are used for detecting the object, becomes an image in which the resolution is high in the central part and as the image height becomes higher, the resolution lowers.

In the case where there a person in the central part of the field to be photographed, as is illustrated in FIG. 5A, the object is detected in a region of which the resolution is high, and accordingly the person can be detected. Then, the focus detecting region 124 is set in the vicinity of the face of the person, and a picture which focuses on the face of the person results in being capable of being photographed. On the other hand, in the case where there is a person in the peripheral part of the field to be photographed, as is illustrated in FIG. 5B, the object is detected in a region of which the resolution is low. Accordingly, the person cannot be detected, and the above described normal automatic focus detecting operation is performed. Because of this, the focus detecting region 124 is set not at the person but at a region of which the contrast in the field to be photographed is high, and the face of the person results in being not focused.

Then, it will be considered that the CPU 101 changes the weighting for each of the primary color signals of R, G and B according the image height, when forming the signals for object detection.

Figure 6A:
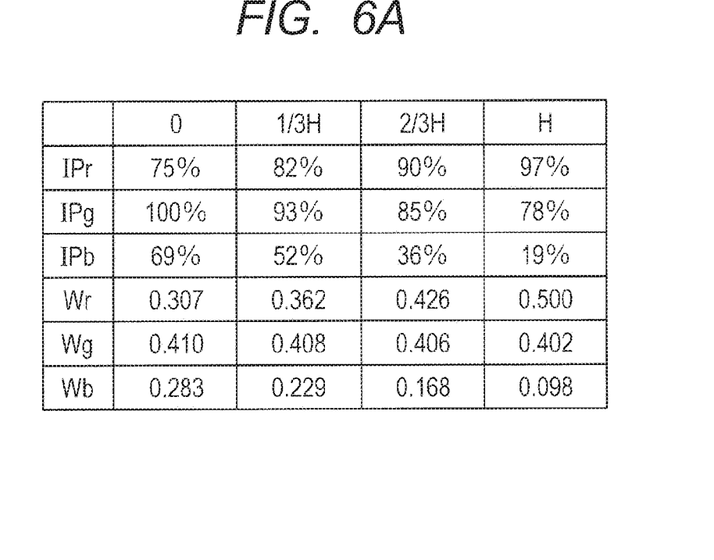
FIGS. 6A and 6B are views illustrating examples of weighting coefficients which are set according to image heights.
Figure 7:
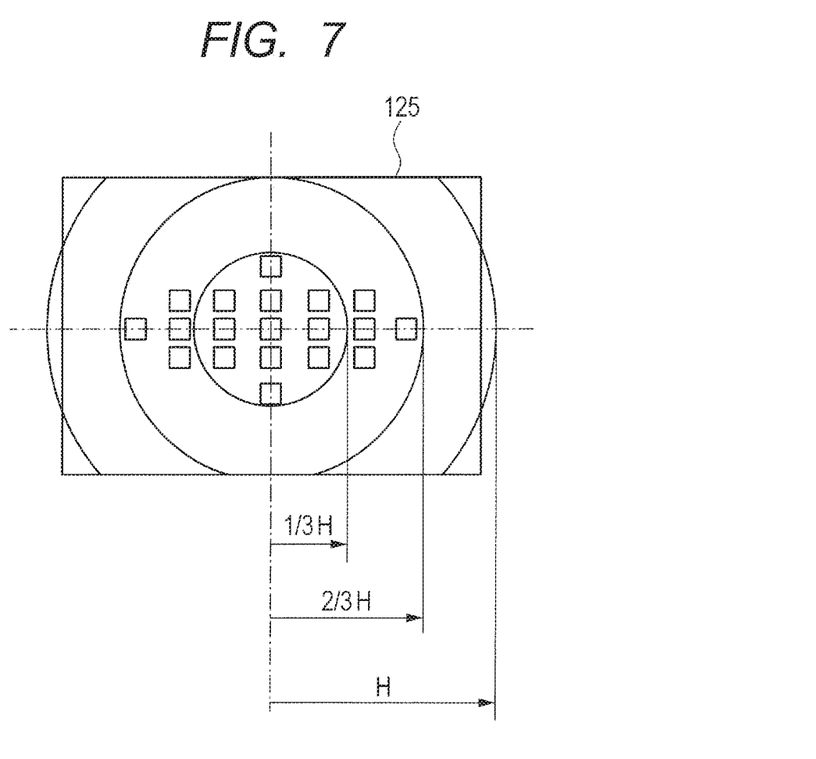
FIG. 7 is a view illustrating an example of divided photometric regions.

FIG. 6A illustrates an example of weighting coefficients Wr, Wg and Wb for the colors of R, G and B, respectively, in each of the image heights, which are determined based on the imaging states each of the colors of R, G and B on the photometric sensor 122, which have been described in FIG. 4B. Here, H in the photometric region 125 is divided into three from the image height 0, as is illustrated in FIG. 7, and the weighting coefficients Sir, big and Wb of each of the colors of R, G and B at the image heights 0, ⅓ H, ⅔ H and H are shown. The weighting coefficients of each of the colors shall be determined by:

$Wr = IPr/(IPr+IPg+IPb)$, $Wg = IPg/(IPr+IPg+IPb)$, and $Wb = IPb/(IPr+IPg+IPb)$.

Incidentally, the method for calculating the weighting coefficient is not limited.

Figure 6B:
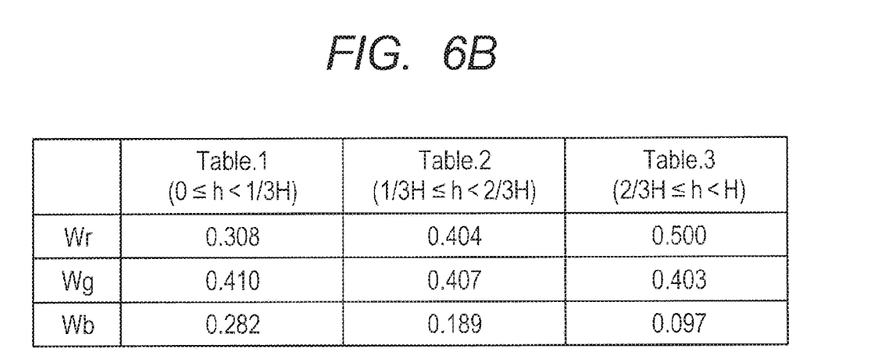

FIG. 6A illustrates an example of a table parameter of weighting coefficients in the present embodiment. In the present embodiment, the weighting coefficients Wr, Wg and Wb are each set to regions in which H in the photometric region 125 is divided into three from the image height 0, as is illustrated in FIG. 6B. For instance, Table. 1 is a region in which the image height h satisfies 0≤h<⅓ H. Table 2 is a region in which the image height h satisfies ⅓ H≤h<⅔ H. Table 3 is a region in which the image height h satisfies ⅔ H≤h<H. The weighting coefficient is determined according to the above described weighting coefficients Wr, Wg and Wb of each of the colors of R, G and B, which have been determined based on each of the previously described image heights. For instance, the average value of the weighting coefficients n each of the image heights may be applied to these three regions. In the example illustrated in FIG. 5B, the weighting coefficient of Ug is larger than those of the other colors, in the range in which the image height h satisfies 0≤h<⅔ E, but the weighting coefficient of Wr is larger than those of the other colors in the range in which the image height h satisfies ⅔ H≤h<H. Thus, the color corresponding to the largest weighting coefficient may be determined so as to be different from the other colors, according to the region. The table parameter of the weighting coefficient is stored in the EEPROM 101a in the CPU 101.

The CPU 101 selects by what weighting coefficient each signal is multiplied, when forming the signals for object detection, based on the relationship between the coordinate of the photometric sensor 122 and three regions. The CPU 101 sets the weighting coefficients Wr, Wg and Wb of each of the colors of R, G and B according to the image heights, thereby can change an addition ratios for the signals of each of the colors of R, G and B, and can form signals for object detection, in which a signal having a high resolution is more weighted. Thereby, even though the above described photometric lens 121 has the previously described imaging performance having aberration such as the axial chromatic aberration and the curvature of the image plane, the CPU 101 can reduce the lowering of the object detection performance in the peripheral part.

Next, the operation of the single-lens reflex camera according to the first embodiment will be described with reference to the flow chart in FIG. 8.

In a step S1, an unillustrated power source switch is turned ON from the non-operative state of the camera, and then a photographing operation is started. Incidentally, suppose that an automatically selecting operation is selected as the focus detecting operation of the lens unit 105.

In a step S2, the CPU 101 determines whether or not the release SW 140 has been pushed in to the SW1. When the SW1 is not turned ON, the CPU 101 waits until the SW1 is pushed in.

In a step S3, the photometric sensor 122 starts accumulation under the control of the CPU 101, and acquired analog signals in the photometric sensor 122 are converted into digital signals by the CPU 101, and then are temporarily stored in the VRAM 10.

In a step S4, under the control of the CPU 101, the signals for object detection are formed from the digital signals of the photometric sensor 122, which have been stored in the VRAM 103 in the step S3. At this time, the weighting coefficients of Wr, Wg and Wb are used which have been set according to the image height, as are illustrated in FIG. 6B. The feature part of the face such as the eyes, the nose and the mouth is extracted from the formed image for object detection, and the objects of the face and the laser are detected.

In a step S5, the CPU 101 determines whether or not the face has been capable of being detected, from the result of the object detecting operation which has been performed in the step S4. When the face has been capable of being detected, the process progresses to a step S6. When the face has not been capable of being detected, the process progresses to a step S7.

In the step S6, a face detecting priority focus detecting operation is performed. Specifically, under the control of the CPU 101, the coordinate of the face which has been detected in the step S4 is sent to the focus detecting unit 119, and the focus detecting operation is performed for the vicinity of the face.

On the other hand, in the step S7, the normal automatic focus detecting operation is performed. Specifically, under the control of the CPU 101, the focus detecting operation is performed for the object which is nearest to the photographer side (imaging apparatus side) or the object of which the difference between light and darkness (contrast) is highest, in each of the regions, based on a defocusing amount that has been calculated for each point of the focus detecting regions 124.

In a step S8, under the control of the CPU 101, the luminance information is calculated in which the output of the photometric sensor 122 that has been temporarily stored in the step S3 is divided into 20×20. Then, the CPU 101 performs a predetermined algorithm computation assigning weights to the focus detecting region 124 which has been selected in the step S6 or in the step S7. By doing this, the CPU 101 computes the diaphragm value of the lens unit 105, which is the exposure value of the camera, and the shutter speed of the focal plane shutter 113.

In a step S9, the CPU 101 determines whether or not the release SW140 has been pushed in to the SW2. When the SW2 is turned ON, the process progresses to a step S10; and the CPU 101 transmits the signals to each of the shutter controlling unit, the diaphragm driving unit and the imaging sensor controlling unit 108, and performs the widely known photographing operation. When the SW2 is not turned ON, the process returns to the step S2.

As has been described above, the camera is structured so as to detect an object based on the information for object detection, which has been formed with the use of the parameters that have been set for each of the wavelength regions according to the region in the photometric region, when detecting the object by using the photometric optical elements and the photometric image sensor, and accordingly can reduce the lowering of the precision of the object detection.

Second Embodiment

Next, a second embodiment will be described below. Hereafter, points different from those in the first embodiment will be mainly described. The structure of the camera is as has been described. In the first embodiment, and here the description will be omitted.

In the first embodiment, the CPU 101 has changed the weighting for each of the signals of primary colors of R, G and B according to the image height to form the signals for the object detection. On the other hand, in the second embodiment, the CPU 101 forms a plurality of signals for object detection by using uniform weighting.

For instance, the CPU 101 forms the image for object detection by using the weighting coefficients in Table 1 (in which image height h satisfies 0≤h<⅓ H), which are illustrated in FIG. 6B, and also forms the image for object detection by using the weighting coefficients in Table. 3 (in which image height h satisfies ⅔ H≤h<H). Then, the CPU 101 subjects these two sheets of images for object detection to the object detecting operation to detect the object. The image for the object detection, which has been formed with the use of the weighting coefficients in Table 1, is obtained as an image of which the resolution is high in the central part. In addition, the image for the object detection, which has been formed with the use of the weighting coefficients in Table 3, is obtained as an image of which the resolution is high in the peripheral part. Thereby, the CPU 101 can detect the object based on the images of which the resolutions are high each in the central part and the peripheral part.

Figure 9:
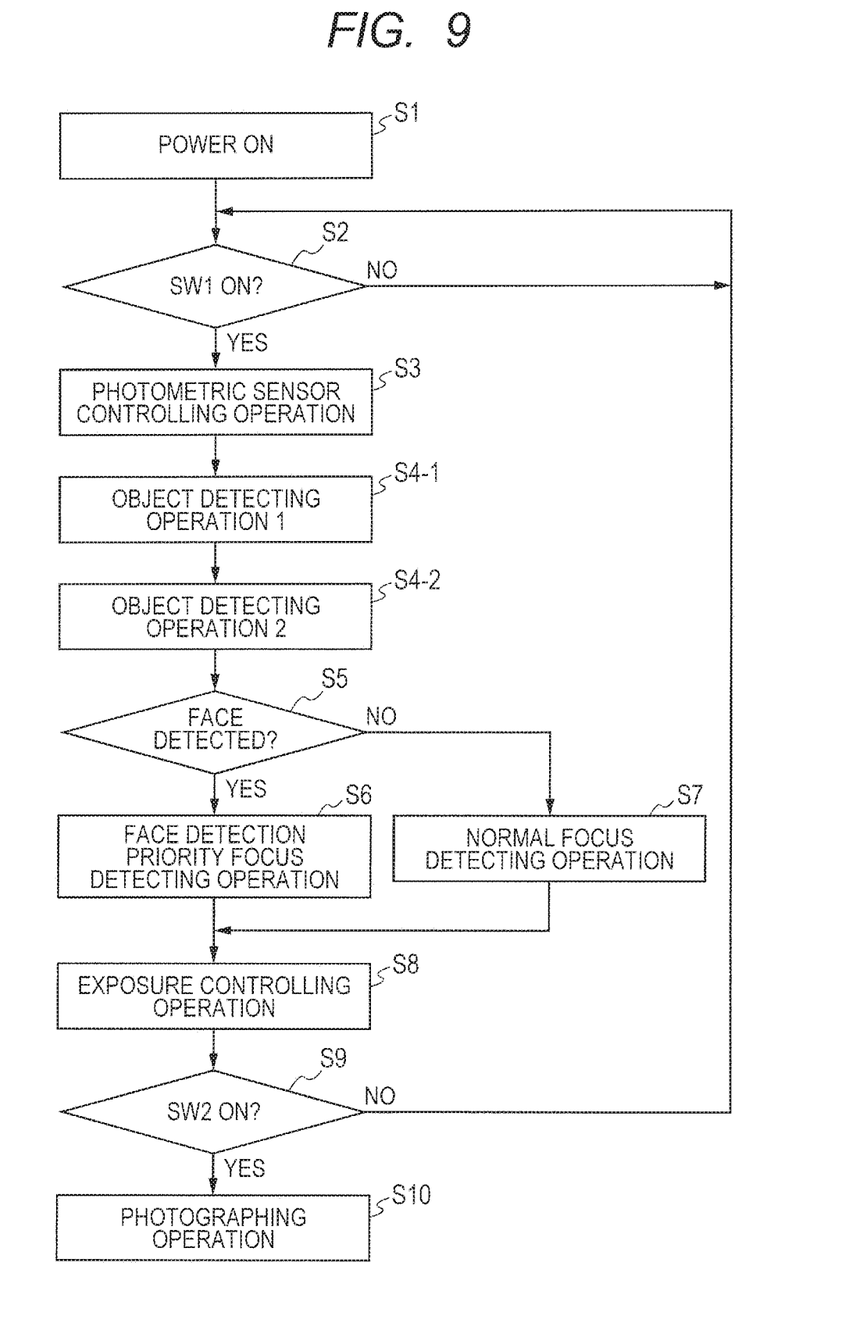
FIG. 9 is a flow chart illustrating an operation of the single-lens reflex camera according to a second embodiment.

Next, the operation of the single-lens reflex camera according to the second embodiment will be described below, with reference to the flow chart in FIG. 9.

Figure 8:
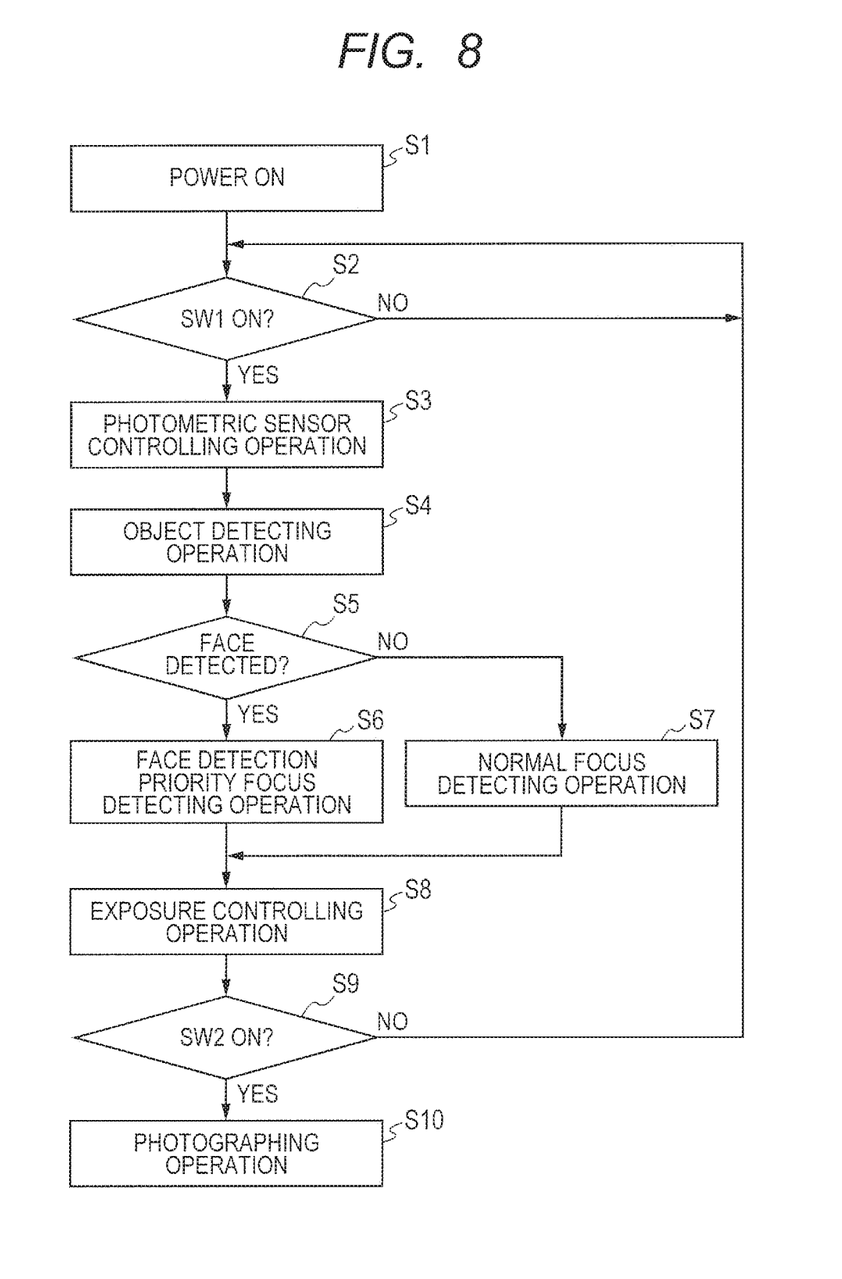
FIG. 8 is a flow chart illustrating an operation of a single-lens reflex camera according to a first embodiment.

The operations in steps S1 to S4 are the same as those in the steps S1 to S4 in FIG. 8.

In the step S4-1, under the control of the CPU 101, the signals for object detection are formed, for which Wr, Wg and Wb in Table, 1 illustrated. In FIG. 6B are used as the weighting coefficients, from the digital signals of the photometric sensor 122, which have been stored in the VRAM 103 in the step S3. Then, the feature part of the face such as the eyes, the nose and the mouth is extracted from the formed image for the object detection, and the objects of the face and the like are detected.

In the step S4-2, under the control of the CPU 101, the signals for object detection are formed, for which Wr, Wg and Wb in Table. 3 illustrated in FIG. 6B are used as the weighting coefficients, from the digital signals of the photometric sensor 122, which have been stored in the VPAM 103 in the step S3. Then, the feature part of the face such as the eyes, the nose and the mouth is extracted from the formed image for the object detection, and the objects of the face and the like are detected.

In a step 35, the CPU 101 determines whether or not the face has been capable of being detected, from the results of the object detecting operations which have been performed. In the step S4-1 and the step S4-2. When the face has been capable of being detected, the process progresses to a step S7, and when the face has not been capable of being detected, the process progresses to a step 38. The operations in subsequent steps S7 to S10 are the same as those in the steps S7 to S10 in FIG. 8.

As has been described above, the camera is structured so as to detect an object, based on the information for object detection, which has been formed with the use of the parameters that have been set for each of the wavelength regions in one region in the photometric region 125, and on the information for object detection, which has been formed with the use of the parameters that have been set for each of the wavelength regions in another region, when detecting the object by using the photometric optical elements and the photometric image sensor, and accordingly can reduce the lowering of the precision of the object detection.

The present invention has been described above together with the embodiments, but the above described embodiments are merely examples how the present invention can be practiced, and the technical scope of the present invention should not be restrictedly interpreted by the embodiments. In other words, the present invention can be practiced in various ways without departing from the technical concept or main features of the invention.

For instance, in the present embodiment, the photometric optical elements and the photometric sensor of the single-lens reflex camera have been described as an example, but a similar technique can also be applied to the photographing lens and an image sensor in a unit of a camera mounted on a mobile phone or a tablet PC. Any combination of the optical system and the image sensor is acceptable as long as the unit has a structure generating signals while changing the ratio at which the signals corresponding to different wavelength regions are added, according to the regions of the image sensor.

In addition, in the present embodiment, an example has been described in which the signals are obtained by addition of the signals corresponding to the different wavelength regions, and are used for the object detection, but the contrast of the information obtained from the image sensor may be detected with the use of the signal obtained by the addition, and may be used for focus adjustment. As long as the processing uses the edge situation of the object, the processing may be another processing.

Other Embodiments

Embodiment (a) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s) The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-059363, filed Mar. 23, 2015, which is hereby incorporated by reference herein in its entirety.

What is claimed is:

1. An imaging apparatus comprising:
    a first image sensor which has a plurality of color filters, each corresponding to each of rays of light having wavelengths different from each other; and
    a CPU which synthesizes signals corresponding to the plurality of color filters, at predetermined ratios, respectively, wherein
    a focus position, in a first region of the first image sensor, for rays of light corresponding to the plurality of color filters is different from a focus position, in a second region of the first image sensor, for rays of light corresponding to the plurality of color filters, and
    the CPU changes the predetermined ratios, into different values in the first region and in the second region, according to the focus position for the rays of light corresponding to each of the plurality of color filters.

2. The imaging apparatus according to claim 1, wherein in the first region of the first image sensor, the CPU sets a ratio of a signal corresponding to a first color filter among the signals which correspond to the plurality of color filters respectively, so as to be larger than a ratio of another signal, and in the second region of the first image sensor, the CPU sets a ratio of a signal corresponding to a second color filter among the signals which correspond to the plurality of color filters respectively, so as to be larger than a ratio of another signal.

3. The imaging apparatus according to claim 2, wherein the region is divided according to the image height; and
    the second region is a region of which the image height is higher than that of the first region, and a wavelength of ray of light corresponding to the second color filter is longer than a wavelength of ray of light corresponding to the first color filter.

4. The imaging apparatus according to claim 1, wherein the CPU detects an object by using signals that have been generated by synthesizing the signals corresponding to the plurality of color filters.

5. The imaging apparatus according to claim 1, wherein the CPU detects a contrast by using signals that have been generated by synthesizing the signals corresponding to the plurality of color filters.

6. The imaging apparatus according to claim 1, comprising a second image sensor which is different from the first image sensor, wherein
    the first image sensor is a photometric sensor, and the second image sensor is an imaging sensor which generates an image for recording.

7. The imaging apparatus according to claim 6, further comprising a photometric lens which guides an image in a field to be photographed, to the first image sensor.

8. The imaging apparatus according to claim 1, wherein the CPU synthesizes signals corresponding to the plurality of color filters respectively, at a uniform ratio, in the first image sensor, and generates signals for measuring the luminance in the field to be photographed.

9. A method for controlling an imaging apparatus which comprises
a first image sensor having a plurality of color filters, each corresponding to each of rays of light having wavelengths different from each other, comprising:
synthesizes signals corresponding to the plurality of color filters at predetermined ratios, respectively, wherein,
a focus position, in a first region of the first image sensor, for rays of light corresponding to the plurality of color filters is different from a focus position, in a second region of the first image sensor, for rays of light corresponding to the plurality of color filters, and
the predetermined ratio is changed into different values in the first region and in the second region, according to the focus position for the rays of light corresponding to each of the plurality of color filters.

10. The method for controlling the imaging apparatus according to claim 9, wherein in a first region of the first image sensor, in the adding, a ratio of a signal corresponding to a first color filter among the signals which correspond to the plurality of color filters respectively is set, so as to be larger than a ratio of another signal, and in a second region of the first image sensor, in the adding, a ratio of a signal corresponding to a second color filter among the signals which correspond to the plurality of color filters respectively is set, so as to be larger than a ratio of another signal.

11. The method for controlling the imaging apparatus according to claim 10, wherein
the region is divided according to the image height; and
the second region is a region of which the image height is higher than that of the first region, and a wavelength of ray of light corresponding to the second color filter is longer than a wavelength of ray of light corresponding to the first color filter.

12. The method for controlling the imaging apparatus according to claim 9, wherein an object is detected by using signals that have been generated by synthesizing the signals corresponding to the plurality of color filters.

13. The method for controlling the imaging apparatus according to claim 9, wherein contrast is detected by using signals that have been generated.

14. The method for controlling the imaging apparatus according to claim 9, wherein
the imaging apparatus further comprises a second image sensor which is different from the first image sensor; and
the first image sensor is a photometric sensor, and the second image sensor is an imaging sensor which generates an image for recording.

15. The method for controlling the imaging apparatus according to claim 14, wherein the imaging apparatus further comprises a photometric lens which guides an image in a field to be photographed, to the first image sensor.

16. The method for controlling the imaging apparatus according to claim 9, wherein signals corresponding to the plurality of color filters is synthesized respectively at a uniform ratio, in the first image sensor, and signals for measuring the luminance in the field to be photographed are generated.

17. The imaging apparatus according to claim 1, wherein,
in the first region of the first image sensor, the CPU synthesizes, at a first ratio, a signal corresponding to a first color filter among the signals which correspond to the plurality of color filters respectively, and,
in the second region of the first image sensor, the CPU synthesizes, at a second ratio, that is smaller than the first ratio, a signal corresponding to the first color filter among the signals which correspond to the plurality of color filters respectively.

18. The method for controlling the imaging apparatus according to claim 9, wherein,
in the first region of the first image sensor, a signal corresponding to a first color filter among the signals which correspond to the plurality of color filters respectively is synthesized at a first ratio, and,
in the second region of the first image sensor, a signal corresponding to the first color filter among the signals which correspond to the plurality of color filters respectively is synthesized at a second ratio, that is smaller than the first ratio.

* * * * *